US005731814A

United States Patent [19]
Bala

[11] Patent Number: 5,731,814
[45] Date of Patent: Mar. 24, 1998

[54] METHOD AND APPARATUS FOR IDENTIFYING AN OBJECT SELECTED ON A COMPUTER OUTPUT DISPLAY

[75] Inventor: Gregory Paul Bala, San Jose, Calif.

[73] Assignee: Oracle Corporation, Redwood Shores, Calif.

[21] Appl. No.: 578,071

[22] Filed: Dec. 27, 1995

[51] Int. Cl.[6] ........................................ G06F 3/14
[52] U.S. Cl. ...................... 345/356; 345/348; 345/352; 345/353; 345/355
[58] Field of Search .............................. 395/355, 356, 395/352, 353, 348, 346, 336, 340, 344; 345/352, 356, 353, 355

[56] References Cited

U.S. PATENT DOCUMENTS

| | | | |
|---|---|---|---|
| 5,335,323 | 8/1994 | Kolnick | 395/340 |
| 5,625,783 | 4/1997 | Ezekiel et al. | 395/352 |
| 5,666,504 | 9/1997 | Crutcher | 345/355 |

OTHER PUBLICATIONS

OpenGL programming guide: the official guide to learning OpenGL, release 1/OpenGL Architecture Review Board; Jackie Neider, Tom Davis, Mason Woo, Chapter 13, pp. 389–390.

Communications of the ACM, Apr., 1993, vol. 36, No. 4, "Information Visualization Using 3D Interactive Animation", Authors: George G. Robertson, Stuart K. Card, and Jock D. Mackinlay.

*Primary Examiner*—Raymond J. Bayerl
*Assistant Examiner*—Chadwick A. Jackson
*Attorney, Agent, or Firm*—Fliesler, Dubb, Meyer & Lovejoy LLP

[57] ABSTRACT

A technique for identifying an object selected from a plurality of objects displayed on an output display is disclosed. The technique includes grouping the objects into a plurality of scenes based on natural groupings. An identifier for each object is generated that uniquely identifies each object displayed. The identifier is dynamically partitioned into "n" segments based on the graphics subsystem, and each segment is mapped to a color representation in the graphics subsystem. In response to user selection of one of the objects, location information, which identifies the location of an object on the display, is generated. During each of "n" time intervals, a color mapped segment for each object is painted in a back buffer of a double buffered graphics subsystem, and the back buffer is subsequently queried for the color at the user selected location. The segments are accumulated to assemble the identifier for the selected object.

18 Claims, 8 Drawing Sheets

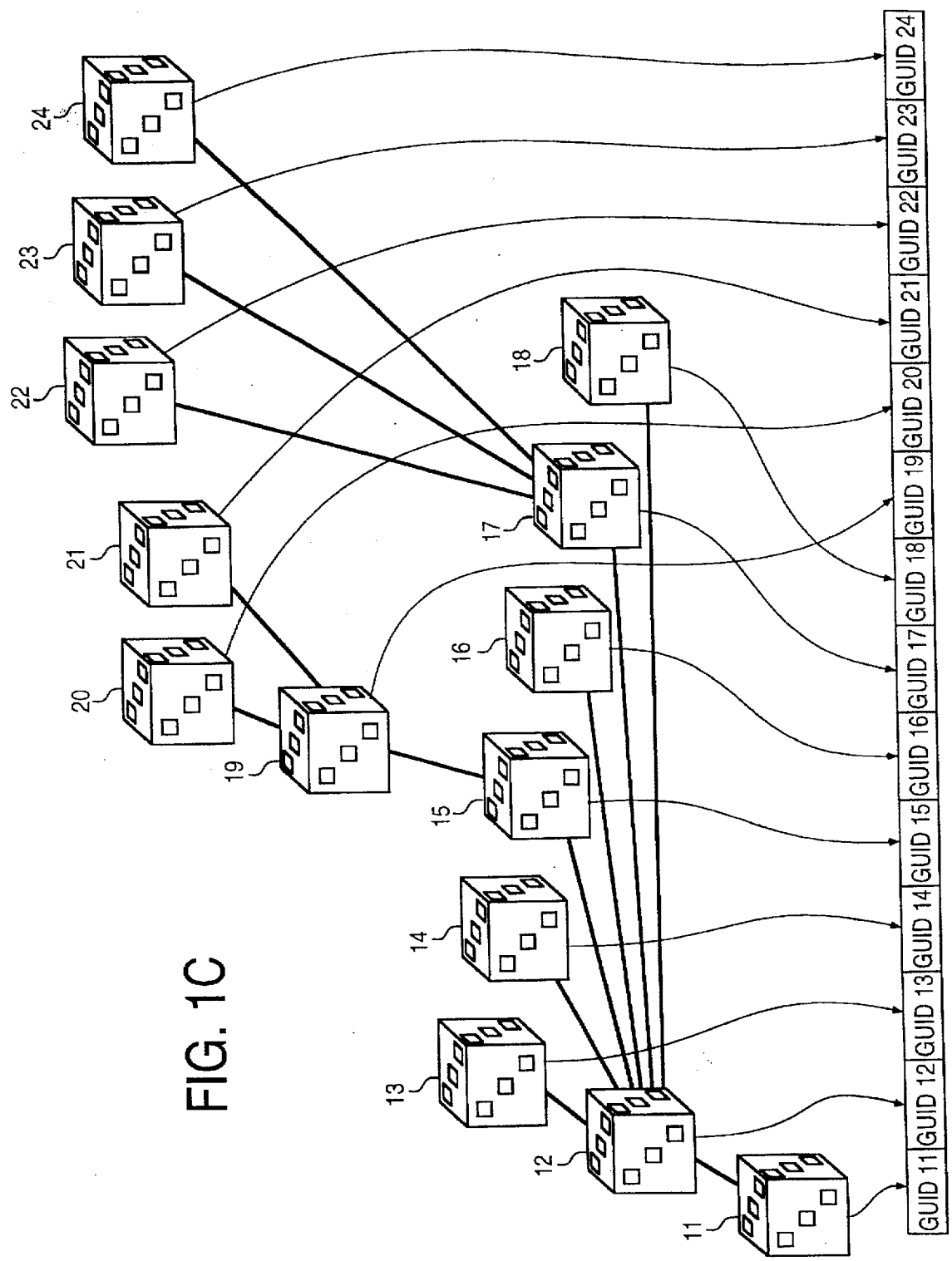

METHOD AND APPARATUS FOR IDENTIFYING AN OBJECT SELECTED ON A COMPUTER OUTPUT DISPLAY

BACKGROUND OF THE INVENTION

1. Field of the Invention

The present invention is directed toward the field of graphical user interfaces, and more particularly to a technique that readily identifies an object selected from a plurality of objects displayed on a computer output display.

2. Art Background

Typically, graphical user interfaces display a combination of text and graphics on a computer output display. The textual and graphical display communicates information to the user about the underlying program (e.g. information pertaining to an operating system or an application program). One application for the display of textual and graphical information is to provide a means for a user to enter information into the computer to communicate with the underlying program. For example, in order to implement a tool or menu bar, a graphical user interface displays a plurality of objects or icons, and the user selects one of the objects to invoke a desired function. In response to the user selection, the underlying program displays additional information that relates to the object or icon selected. Therefore, to implement this paradigm, the graphical user interface is required to correlate the objects displayed with data associated with the objects.

The graphical objects displayed on the output screen for selection by a user may be renderings of two dimensional objects or three dimensional objects. Regardless of the form of the objects, there is a need to manipulate single items from within a visual context that permits a user to uniquely select an object from a screen image. In the prior art, graphics sub-systems manage pick buffers and pick identifiers to identify objects displayed on the screen. However, the pick buffers, and the pick identifiers that they store, are difficult to manipulate and manage. Other conventional solutions to identify objects include executing mathematically intensive reverse geometric calculations. The geometric calculations are typically necessary for precisely computing spatial locations of singular points. The reverse geometric calculations are often used in engineering and scientific CAD or CAE systems.

These prior art techniques often limit the size of an identifier that is used to uniquely identify each object displayed. However, if a display contains a large number of objects, then the identifier must be large enough to uniquely identify each object. For example, in a display that includes numerous complex three dimensional objects, a large identifier, which may be as large as 128 bits, may be required to uniquely identify all the objects being simultaneously displayed. Therefore, it is desirable to provide an identification technique that does not limit the size of the identifiers. Furthermore, it is desirable to provide a technique for identifying selected objects that does not require executing complex management and/or calculation routines.

As is described fully below, the present invention enables the user of a visual interface to point to an object on the output display, and to have the application immediately "see" the object in terms of this identifier, thereby allowing for direct manipulation and/or query of the object.

SUMMARY OF THE INVENTION

A technique for identifying an object selected from a plurality of objects displayed on an output display includes grouping the objects into a plurality of scenes based on natural grouping, such as hierarchical information structures and context/focus displays. A series of global unique identifiers (GUIDs), relating to a particular scene, are generated to uniquely identify each object in a corresponding scene. The GUIDs from each scene are then assembled to generate a composite universally unique identifier to uniquely identify each object displayed. A user selects a scene, and in response, a series of global unique identifiers within the universally unique identifiers are identified. The user selects an object within the scene selected, and a global unique identifier within the series of GUIDs is generated to identify the object selected in the scene. The GUID is inserted in the composite UUID to uniquely identify the object from all objects displayed.

In one embodiment, each GUID within the selected series of GUIDs is partitioned into "n" segments. Each segment of each identifier is mapped, in preparation for storage to memory, into a location such that the location corresponds to a location of an associated object displayed on the output display. The user selects an object, and in response, location information, which identifies the location of an object selected on the output display, is generated.

During each of "n" time intervals, one time interval for each partitioned segment, a segment is stored in memory so that the locations of the segments stored in memory map to corresponding objects displayed on the output display. During each interval and subsequent to storing the segment in memory, segments are retrieved from the memory at the location selected by the user through use of the location information. In this way, segments are extracted and accumulated to assemble the GUID for the selected object.

In one embodiments the segments of the identifier are stored in a back buffer of a double buffered graphics subsystem. For this embodiment, the segments are mapped to a color representation in accordance with the graphics subsystem driving the output display. The configuration is dynamic such that the pixel capacity in the graphics subsystem is queried. Through use of the pixel capacity information, the mapping to the color representation is optimized. During each time interval, the back buffer is re-painted with the color representation for the current segment of each object. Then, the back buffer is queried to extract the color at the user selected location, and the segments are accumulated to assemble the identifier for the object selected.

BRIEF DESCRIPTION OF THE DRAWINGS

FIG. 1c illustrates an example composite UUID generated from a plurality of GUID's from scene objects.

DETAILED DESCRIPTION OF THE PREFERRED EMBODIMENTS

As is described below, the present invention permits a user to select an object, displayed on a computer output display or screen, and have the object be readily identified by the computer system. For purposes of explanation, an object is any pixel configuration that may be selected by a user. As will be apparent to one skilled in the art, the present invention has a wide variety of applications for any program utilizing a screen display to receive information.

Figure 1A:
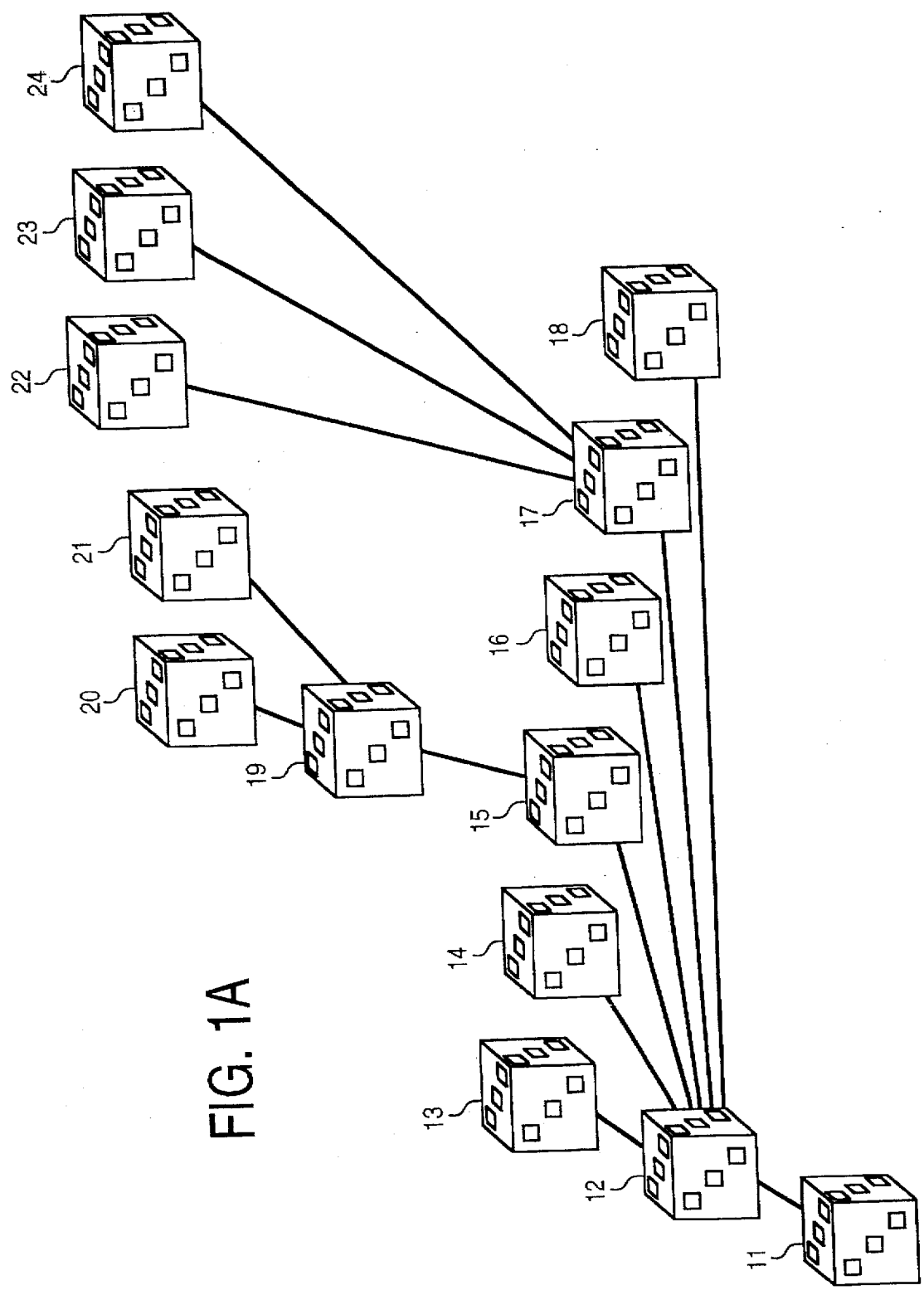
FIG. 1a illustrates an example output display that displays a plurality of three dimensional objects.

FIG. 1a illustrates an example output display that displays a plurality of three dimensional objects. Although FIG. 1a shows an example display with three dimensional objects, any objects, including graphical and/or textual objects, may be rendered for use with the present invention. For the example display shown in FIG. 1a, the three dimensional objects displayed may graphically depict objects for modeling an object oriented program. In order to select an object, a user, via an input control device, places a cursor on the desired object, and the user selects an object, via a keyboard or cursor control device. Depending upon the application, the user may select an object to obtain further information about the object (e.g. query the object) or to invoke an operation, such as a function, tool or application program.

In one embodiment, the example display shown in FIG. 1a graphically depicts a plurality of objects in an object oriented programming environment. For this example system, a user selects one of the objects to obtain further information relating to the selected object (e.g. specific methods, attributes, and interfaces for the objects selected). When an object is queried by a users the program retrieves data associated with the object selected. For example, the data may be utilized to render another display on the output display or to provide information about the object selected. Generally, in order to implement such a function, regardless of the underlying application, data are associated with and are subsequently retrieved for each object displayed. In one embodiment, each object displayed has an associated data structure.

In order to manage and manipulate data associated with an object, each object contains an unique computational identifier. For purposes of explanation, the unique computational identifier associated with a graphically displayed object is referred to as a universally unique identifier (UUID). For systems that render numerous graphical objects on a single display screen, a large universal unique identifier field may be required to support a bit string of several hundred bits. For example, a three dimensional rendering may contain thousands of objects on a single display screen, even though certain objects may be rendered with very few pixels. To display thousands of objects, a graphical display may appear as a cluster of objects in order to provide a broad level view of an intricate model or structure. For such a display, in order to uniquely identify each of the thousands of objects, a large universally unique identifier is required. As is well known, a universally unique identifier requires "n" bits to uniquely identify $2^n$ objects. As is described more fully below, the techniques of the present invention permit use of large universally unique identifiers that contain long bit strings.

One visual paradigm for presenting information to a user is through use of hierarchical information structures. For example, a three dimensional cone tree visualization presents information in a hierarchical structure such that cones emanate from elements of a higher hierarchical level to elements in a lower hierarchical level. The lower hierarchical level element provides more specific information about the element expanded by the cone. As a further example of a hierarchical information structured a spatial structure of a building may be utilized as a structural browser to identify people in an organization. The spatial structure building paradigm presents information about people located in different rooms and floors, analogous to their locations in a building. Another application for hierarchical information structures is a menu in a graphical user interface that presents options to a user. The user selects a particular category in a first hierarchical level to receive additional menus and choices in a next lower hierarchical level. Hierarchical information structures have application as three dimensional browsers, such as a three dimensional World-Wide Web browser. A three dimensional Web browser language, known as the virtual reality modeling language (VRML), is ideally suited to generating hierarchical scenes. For more information on a three dimensional browser language, see the virtual reality modeling language (VRML), version 1.0 specification, May 26, 1995.

Figure 1B:
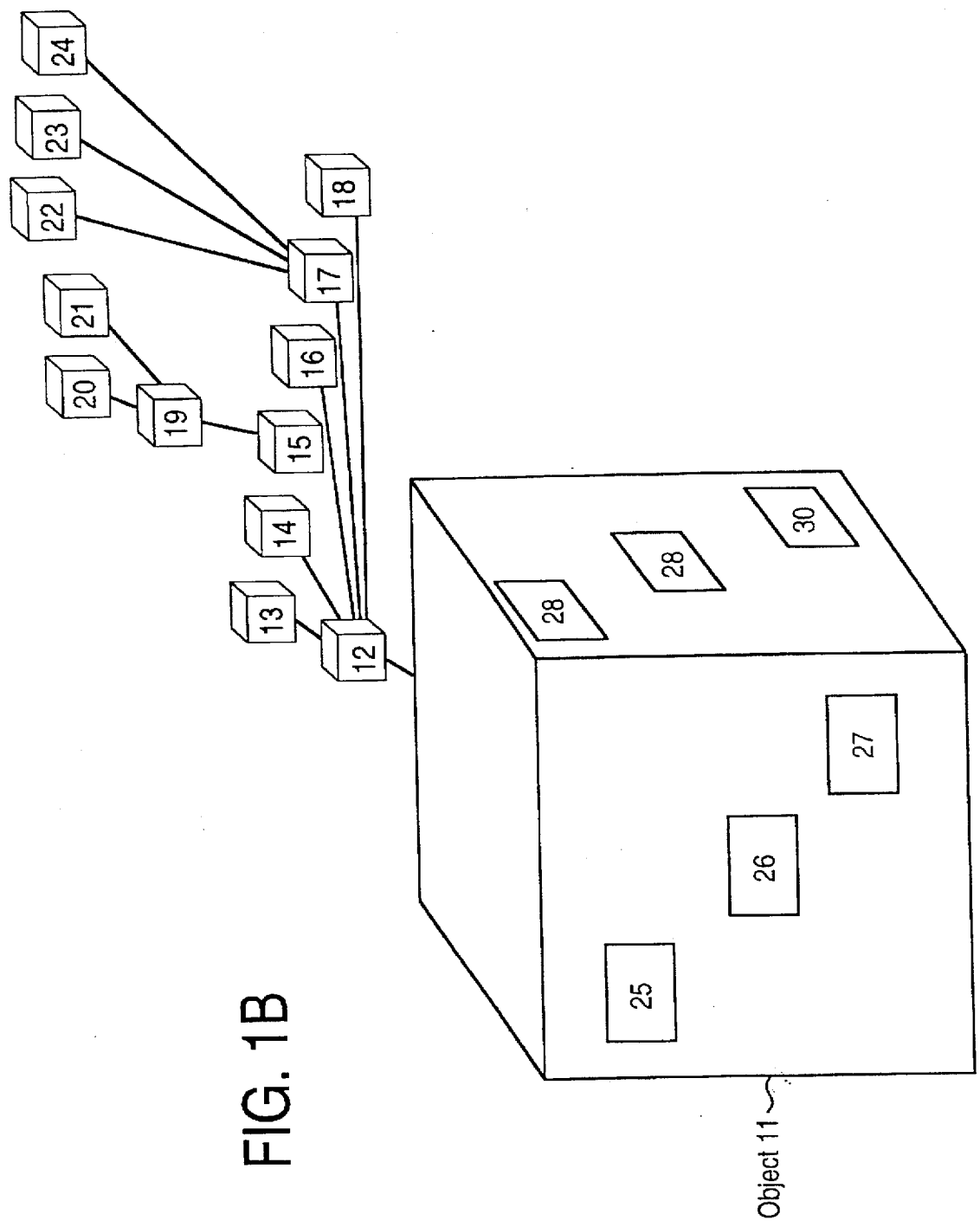
FIG. 1b illustrates an example display that includes a context portion and a focus portion.

In addition to hierarchical information structures, some three dimensional display renderings contain a focus view and additional context information such that there is a boundary, either geometrically, semantically, or both, between the focus and context views. FIG. 1b illustrates an example display that includes a context view and a focus view. In a typical application, the groupings are a result of a user that selects an object or set of objects, pulls the selected objects into focus to make them global while momentarily removing the rest of the context from the focus. The example display in FIG. 1b shows object 11 brought in focus, while the remaining objects are displayed for context. As shown in FIG. 1b, additional objects, 25, 26, 27, 28, 29, and 30, are selectable from object 11, the focused object. The focused object 11 permits a user to select additional items directly on the object that were too small to select from the broad level view. In addition, objects 12–24 retain context for object 11 such that the user may still visualize the entire three dimensional structure for which object 11 is a part thereof.

The presentation of either hierarchical information structures or context/focus displays results in a natural grouping of scene objects. For example, in the example display shown in FIG. 1b, object 11, displayed in the foreground, may be characterized as one scene, and the additional objects 12–24, displayed in the background, may be characterized as a second scene. As is described fully below, the selection technique of the present invention takes advantage of natural groupings of scene objects. As discussed above, a universally unique identifier is assigned for each selectable object displayed on the screen. For a presentation having the natural groupings, each scene area is assigned a partition of a universally unique identifier (UUID). A unique bit configuration in this partition is then assigned to a global unique identifier that uniquely identifies an object in the scene area. This unique bit configuration is defined as a global unique identifier (GUID). For this embodiment; the UUID is constructed by mapping a GUID for each scene into a composite universally unique identifier.

FIG. 1c illustrates an example composite UUID generated from a plurality of GUID's from different scene areas. As shown in FIG. 1c, each object (12–24) contains a plurality of selectable objects. Each of the selectable objects are identified in a global unique identifier that is dependent upon the number of selectable objects in a particular scene area. For example, for object 11, six selectable objects on object 11 result in a three bit global unique identifier, labeled "GUID11" in the composite UUID shown in FIG. 1c. Similarly, a global unique identifier GUID is generated from each scene object to assemble the composite UUID. As is described further below, when there are natural groupings of scene objects, the technique focuses in on a particular scene area to generate the corresponding global unique identifier. For all objects in a particular focus scene or area, only the bit range corresponding to that focus area varies, and all other bits in the UUID are held constant. The length of the GUIDs for a focus area is adjusted to accommodate the number of selectable objects in the particular area. By focusing in on a single scene area the processing required to generate a GUID is greatly reduced from the processing required to generate the entire UUID.

Figure 2:
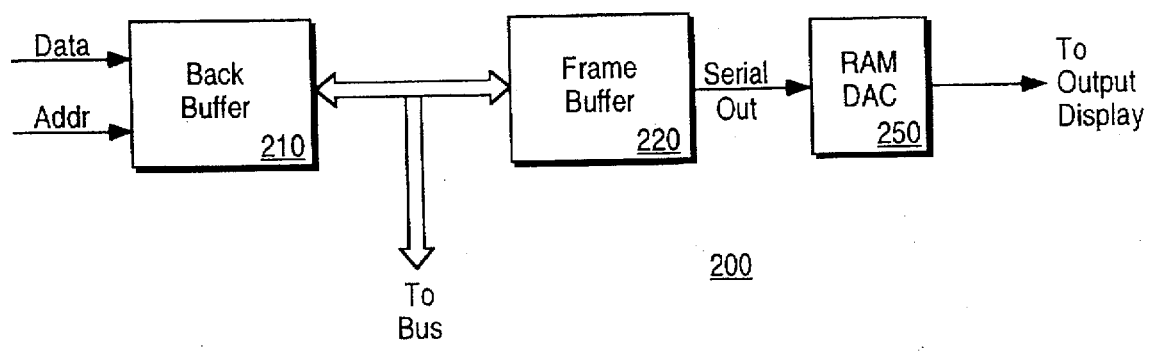
FIG. 2 is a block diagram illustrating one embodiment for a computer graphics sub-system for which the present invention may be implemented.

FIG. 2 is a block diagram illustrating one embodiment for a computer graphics sub-system for which the present invention may be implemented. The graphics sub-system 200 is a double buffered display system. Specifically, the graphics sub-system 200 contains a back buffer 210 and a frame buffer 220. In a double buffered graphics sub-system, such as graphics sub-system 200, pixel data are first painted in the back buffer and then subsequently transferred to the frame buffer. The output display is rendered based on the contents of the frame buffer. In general, double buffered graphics sub-systems permit the generation of complex graphical images in the back buffers which may require extensive processing to generate, while a previously rendered image is currently displayed in the front or frame buffer.

As shown in FIG. 2, the back buffer 210 receives data and address information for painting or storing pixel data to render objects. The back buffer 210 is coupled to the frame buffer 220 for fast transfer of pixel data from the back buffer 210 to the frame buffer 220. In addition, as shown in FIG. 2, the contents of the back buffer 210 may also be transferred, via a bus, to additional areas of the computer, such as the main memory of the computer system. The back buffer 210 may be controlled by either a dedicated graphics processor or may be controlled by the central processing unit (CPU) of the computer. In one embodiment, the back buffer 210 comprises fast access static random access memory (SRAM).

The front buffer or frame buffer 220 comprises a video random access memory (VRAM). In one embodiment for the graphics subsystem 200, the frame buffer 220 transfers pixel data, in a serial bit stream, to a random access memory digital to analog converter (RAM DAC) 250. The RAM DAC 250 receives the pixel data, and it utilizes the pixel data as an index to a color look-up table in the RAM DAC 250. In addition, the RAM DAC 250 converts the output of the color look-up table to an analog signal to drive the output display. The graphics sub-system 200 is representative of a typical double buffered system, and in fact is intended to represent a broad category of graphics processing systems that utilize a double buffer.

Figure 3:
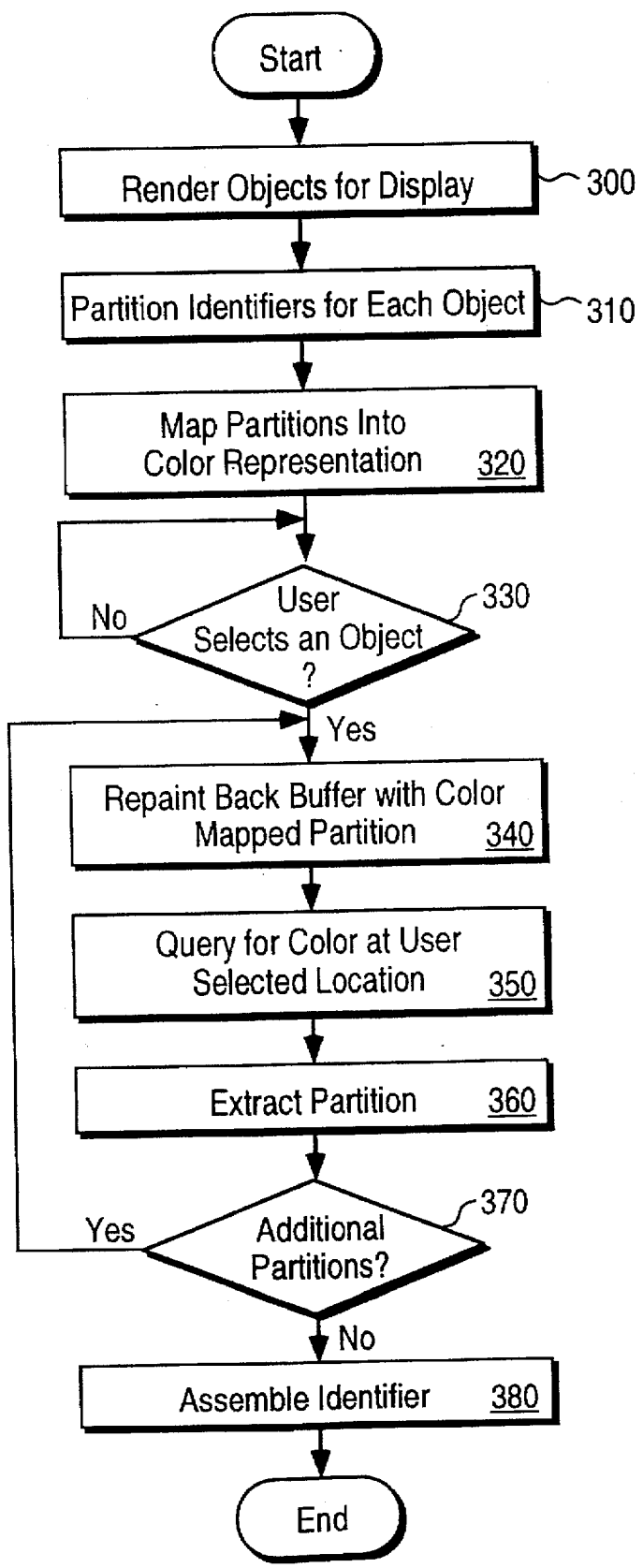
FIG. 3 is a flow diagram illustrating a method for identifying a selected object in accordance with one embodiment of the present invention.

FIG. 3 is a flow diagram illustrating a method for identifying a selected object in accordance with one embodiment of the present invention. As shown in block 300, the objects are rendered for display on the output display. Specifically, in the graphics sub-system 200, the objects are painted in the back buffer 210, and then they are subsequently transferred to the frame buffer 220 for display on the output display.

As discussed above, the length of the unique identifier, either the UUID or GUID, is based on the number of objects being rendered at any one time. However, for any unique identifier, the actual number of partitions is governed by the position of the last non-zero bit in the original global unique identifier field. Each unique identifier, which corresponds to a displayed object, is partitioned based on the color resolution of the pixel data stored in the frame buffer as shown in block 320 in FIG. 3. For example, if the graphics sub-system stores pixels in an 8 bit format, then the unique identifiers are partitioned into 8 bit segments. An example of partitioning a unique identifier is described below in conjunction with Table II.

As shown in block 320, each partition for each unique identifier is mapped into a color representation such that bits from each partition are designated to specify the red, green and blue color composition. An example of color mapping a partition is described below in conjunction with Table II. As shown in the decision block 330 of FIG. 3, the user selects an object currently displayed on the output display.

After the user selects an object, iterative re-paints are executed to the back buffer 210 (FIG. 2). The number of re-paints corresponds to the number of segments, "n", that were partitioned for the unique identifiers. Specifically, as illustrated in block 340 in FIG. 3, the back buffer 210 is re-painted with the first partition of each unique identifier for each object. The first back buffer repaint occurs during a first time interval. Also, during the first time interval, the color is queried at the object location selected by the user as shown in block 350. From the color obtained in the query operation, the bit sequence is extracted as shown in block 360. Specifically, the bit sequence for a partition is extracted from the color representation by extracting the entire pixel value for the location queried. The bit sequence extracted is identical to the bit sequence for the first partition of the unique identifier.

As shown by the decision block 370 and blocks 340, 350, and 360, the back buffer repaints, the color queries, and the bit sequence extractions are executed "n" times, one for each partition. For example, if the length of the longest identifier is 24 bits, and the graphics sub-system stores 8 bits of pixel data, resulting in 3 partitions, then the back buffer repaint, color query, and bit sequence extraction operations are executed 3 times. In order to properly reconstruct the original global unique identifier, each iteration of the repaint, query, and extraction occurs in a specified time interval, such that the repaint and subsequent color query and bit extraction operations are synchronized. Since the back buffer 210 is being painted but not visually rendered, the user never visually sees the iterative repaints, but only sees the original viewing stored in the image in the frame buffer 220.

As shown in block 380 in FIG. 3, the unique identifier is reconstructed by assembling the bit sequences extracted for each partition of the selected object. In a preferred embodiment, the unique identifiers are partitioned such that the first partition corresponds to the most significant bits of the unique identifier. For this embodiment, to assemble the unique identifier, a bit sequence, which starts with the first partition of the global unique identifier and ends with the nth partition, is obtained by appending subsequent partitions on the end of the first partition (e.g., the bit sequence extends from the first partition to the nth partition from right to left). Consequently, the unique identifier that corresponds to the bit location selected is readily generated.

Figure 4A:
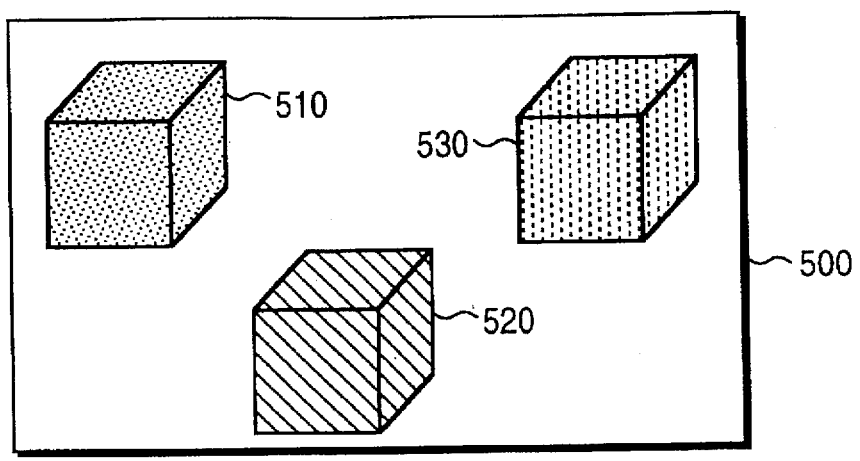
FIGS. 4a, 4b and 4c illustrate the contents of the back buffer through three re-paint iterations for an example display.
Figure 4B:
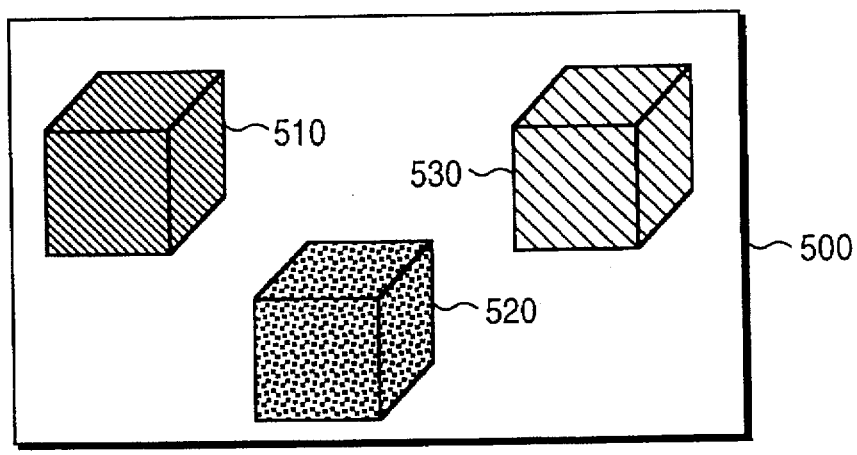
Figure 4C:
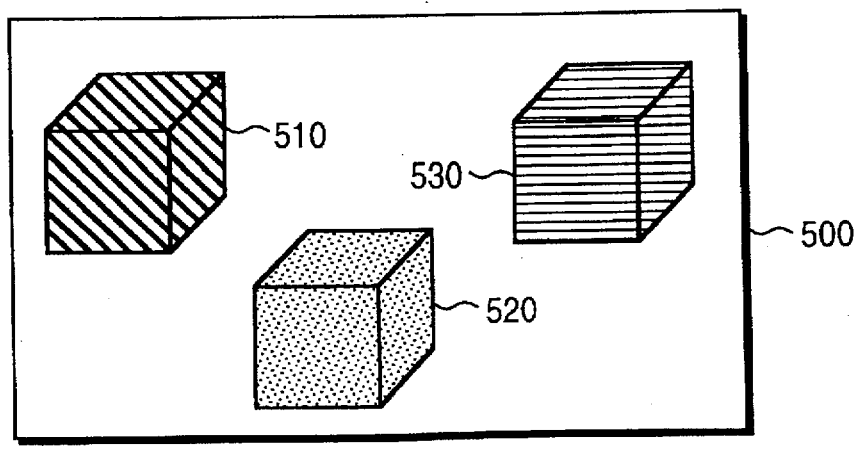

FIGS. 4a, 4b and 4c illustrate the contents of the back buffer through three re-paint iterations for an example display. As discussed above, the back buffer is not rendered on the output display; however, the display of the back buffer illustrated in FIGS. 4a, 4b and 4c demonstrates the re-paint iterations in the back buffer. For this example, the unique identifier is partitioned into three segments, and the output display contains three selectable objects, labeled 510, 520 and 530, that are rendered as three dimensional boxes. FIG. 4a illustrates the three dimensional boxes for a first re-paint, which occurs in a first time interval, for the first color mapped partition. The shadings shown in FIGS. 4a, 4b and 4c represent colors stored in the back buffer. FIG. 4b illustrates the three dimensional objects during a second time interval. Note that for this example, object 520 in FIG. 4a is the same color as object 530 in FIG. 4b. This is a result of the first partition in the unique identifier, which identifies object 520, being the same as the second partition in the unique identifier that identifies object 530. Although colors of objects may be the same in one or more time intervals, the aggregate composite of the entire unique identifier yields a unique bit sequence. FIG. 4c illustrates a third partition, re-painted in a third time interval, for the example back buffer re-paint.

As discussed above, for natural grouping selection applications, a series of GUIDs are generated for each scene area. The technique for selecting objects is then reduced to the scene GUIDs by focusing in on the corresponding scene. To accomplish this, header bits are appended onto the UUID that identify each scene area. In operation, a user selects a scene area from a display containing a plurality of scene areas. For example, for the example displays illustrated in FIGS. 1a and 1b, a user selects object 11 from the scene display in FIG. 1a, and the display of FIG. 1b is generated in response. The header bits are utilized to identify each scene area in a selection technique analogous to generation of a unique identifier (e.g. the method illustrated in FIG. 3).

In a preferred embodiment, the header bits are utilized to identify an entry in a table or data structure. The table contains, for each scene, an offset in length to identify the location and length of the series of GUIDs in the composite UUID.

Table I illustrates an example data structure for storing an offset in length for example scenes.

| | |
|---|---|
| Scene$_0$ | Offset:Length |
| Scene$_1$ | Offset:Length |
| Scene$_2$ | Offset:Length |
| . | . |
| . | . |
| Scene m-2 | Offset:Length |
| Scene m-1 | Offset:Length |
| Scene m | Offset:Length |

The offset in length for the specified scene is then used to "focus in" on the GUID for the corresponding scene area. Note that if the scene area contained multiple hierarchical levels, then multiple header bits are utilized to define scene areas in each hierarchical level. For each hierarchical level in a multiple hierarchical information structure, the selection technique is executed to identify a scene. For example, a first set of header bits in the UUID composite may be utilized to identify scenes in a first level of a hierarchical information structure. Similarly, a second set of header bits may be used to identify the second level of scene areas in the multiple hierarchical information structure. Although the present invention is described in conjunction with the use of header bits to focus in on a particular natural grouping or scene, any mapping to map scenes in natural grouping selections may be utilized without deviating from the spirit and scope of the invention.

As discussed above, the length of each partition or segment in the global unique identifier is based on the number of bits stored to represent a pixel. This factor is dependent upon the graphics subsystem utilized. For example, a graphics sub-system may store 8 bits per pixel. The 8 bit pixel value may subsequently be transformed into a 24 bit representation in the RAM DAC 250. Table II below shows an example identifier that is partitioned in accordance with an 8 bit per pixel graphic sub-system. For this example, the full identifier is:

"1011101010010011001110010111011110100111."

TABLE II

| Partitions | R | G | B |
|---|---|---|---|
| Partition 1 | 101 | 110 | 10 |
| Partition 2 | 100 | 100 | 11 |
| Partition 3 | 001 | 110 | 01 |
| Partition n-1 | 011 | 101 | 11 |
| Partition n | 101 | 001 | 11 |

As shown in Table II, the example unique identifier is partitioned into 8 bit segments. Specifically, for this example, the unique identifier is partitioned into 5 partitions (e.g. "n" is equal to 5). In order to color map the bits in a partition for this example, the first three bits define the red value, the second three bits define the green value, and the last two bits define the blue value.

In the preferred embodiment, the size of the segment is maximized to accommodate the pixel storage size for the particular graphics subsystem. In order to maximize the selection technique of the present invention, the number of bits per storage location and subsequently the number of "n" segments are dynamically determined. For this embodiment, the graphics subsystem is queried to determine the number of bits stored per pixel. For the software implementation, a call to a graphics driver is executed to obtain the pixel storage capacity information. With the pixel storage information, the identifier is partitioned into "n" segments, and each segment is mapped into a color representation for the particular graphics subsystem. The dynamic configuration permits optimizing the selection technique such that a larger pixel storage capacity results in a smaller "n" for a given identifier. If the number of "n" segments is reduced due to a larger pixel storage capacity, then fewer iterations to generate the identifier are required, resulting in a faster process.

Figure 5A:
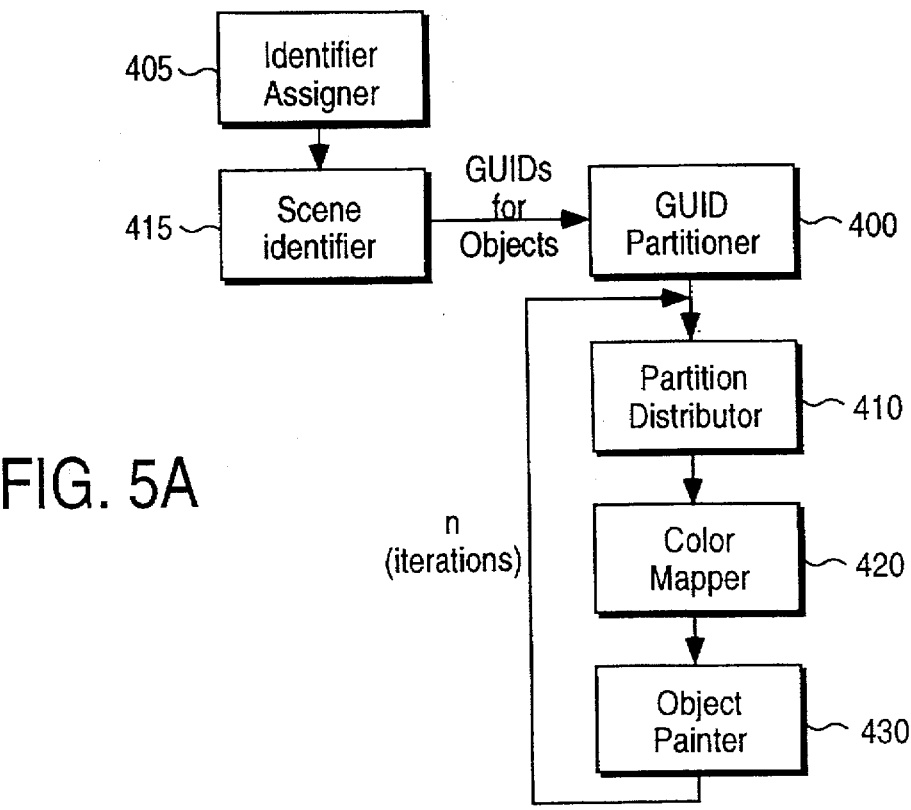
FIGS. 5a and 5b are block diagrams illustrating one embodiment for implementing the present invention.
Figure 5B:
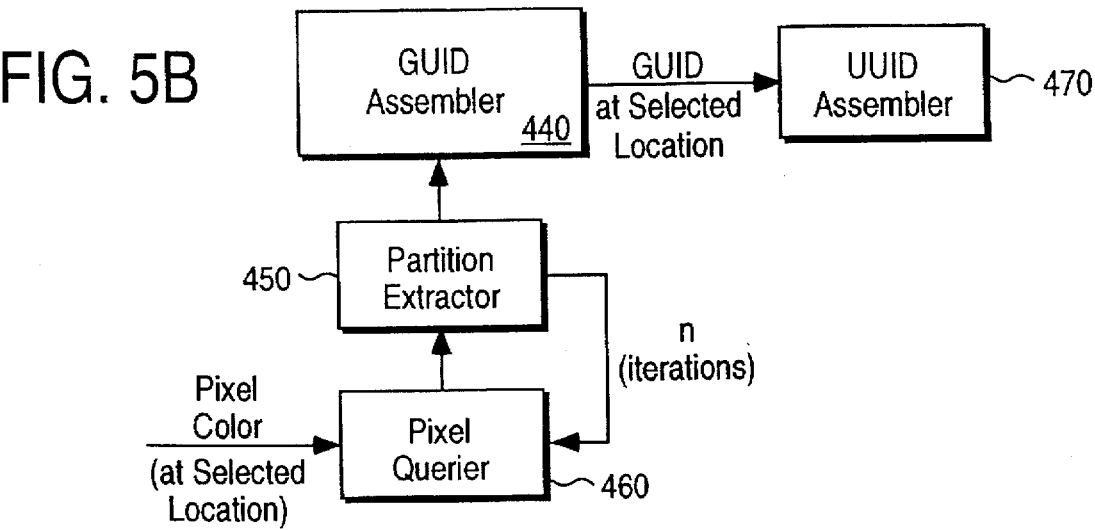

FIGS. 5a and 5b are block diagrams illustrating one embodiment for implementing the present invention. In general, the technique for selecting objects from a display may be implemented in either software or hardware. For the preferred software embodiment, the method is accomplished through the execution of a plurality of computer readable instructions on a general purpose computer. A general purpose computer is described more fully below.

An identifier assigner 405 assigns a global unique identifier for each object in a scene, and it assembles the global unique identifiers from all scenes into a composite universally unique identifier that uniquely identifies each object displayed. A scene identifier 415 receives selection information that identifies a scene selected by a user, and it identifies the corresponding global unique identifiers for a selected scene. In one embodiment, the operation of the scene identifier is analogous to the general operation of the global unique identifier generator described below. The scene identifier 415 outputs the GUIDs for the selected scene.

In general, the global unique identifier generator includes a unique identifier partitioner 400, a partition distributor 410, a color mapper 420, and an object painter 430. As shown in FIG. 5a, the unique identifier partitioner 400 receives global unique identifiers for objects being rendered on the selected scene. The unique identifier partitioner 400 partitions each identifier as discussed above. The partition distributor 410 distributes the partition bits of the identifier based on the location of the objects being rendered on the output display. For example, if an object is rendered in the upper left corner of the output display, then the partition distributor 410 generates coordinates for a corresponding identifier partition, for each re-paint interaction, to re-paint the identifier mapped color to the upper left corner in the back buffer.

The color mapper 420 maps the bits in each partition for each object to the appropriate color (e.g. reds green, and blue). The object painter 430 then re-paints the back buffer with the new pixel data in the locations identified by the partition distributer 410. As shown in FIG. 5a, the partition distributor 410, color mapper 420, and object painter 430 are executed "n" times for "n" re-paint reiterations to the back buffer 210.

FIG. 5b illustrates one embodiment for extracting the unique identifier for the objects selected. The pixel querier 460 receives the pixel color at the selected location. In general, the color is obtained by reading the pixel data in the back buffer 210 at the user specified location. In the software embodiment, the pixel color is obtained from a call to a graphics routine that retrieves the color at a screen location selected by a user. For more information on extracting a color via a software routine, see Neider, Davis, Woo, Open GL Programming Guide; Addison-Wesley; 1993. The pixel querier 460 receives, each time interval, a color representation for the user selected location. A partition extractor 450 extracts the bits from the color representation. Subsequently, the unique identifier assembler 440 assembles the bit sequence to reconstruct the unique identifier for the object selected. A UUID assembler 470 then assembles the GUID generated into a UUID composite to uniquely identify the selected object from all objects displayed.

In the realm of abstract information objects, the queries at precise singular locations on renderings of such objects are usually not necessary. The present invention has an advantage over the pick buffer technique because a pick list imposes a predefined limit on the number of selectable objects in a single output display. This limitation may not be sufficient for the potential richness in the number of objects being displayed. Furthermore, the management of pick buffers introduces additional programmatic complexity when selection capability is implemented. The present invention has application for selection of any type of object display (e.g. two dimensional or three dimensional renderings). For example, the selection technique of the present invention has application in mechanical and/or electronic CAD or CAE.

The selection technique of the present invention provides a selection mechanism with scalability that is measured by the number of objects being rendered, the maximum unique identifier magnitude, and the pixel color resolution of the output display. Furthermore, the selection technique of the present invention requires programmatic complexity no greater than what is already in place to render the objects for viewing. A key property to accomplish this technique is the boundlessness of the number of selectable objects through the leveraging of the time domain to accommodate selecting any unique identifying range.

After recovering the unique identifier for a selected object, it is used to access data corresponding to the object selected. In one embodiment, the unique identifier is used as an entry to an array. The array stores a plurality of pointers that identify the location in memory of the corresponding data structures. Through use of the array, access to the data corresponding to the object selected is readily accessible. Although the selection technique of the present invention is directed toward recovering the unique identifier for a selected objects the unique identifier may be used in any manner to identify a corresponding data structure or data set.

Figure 6:
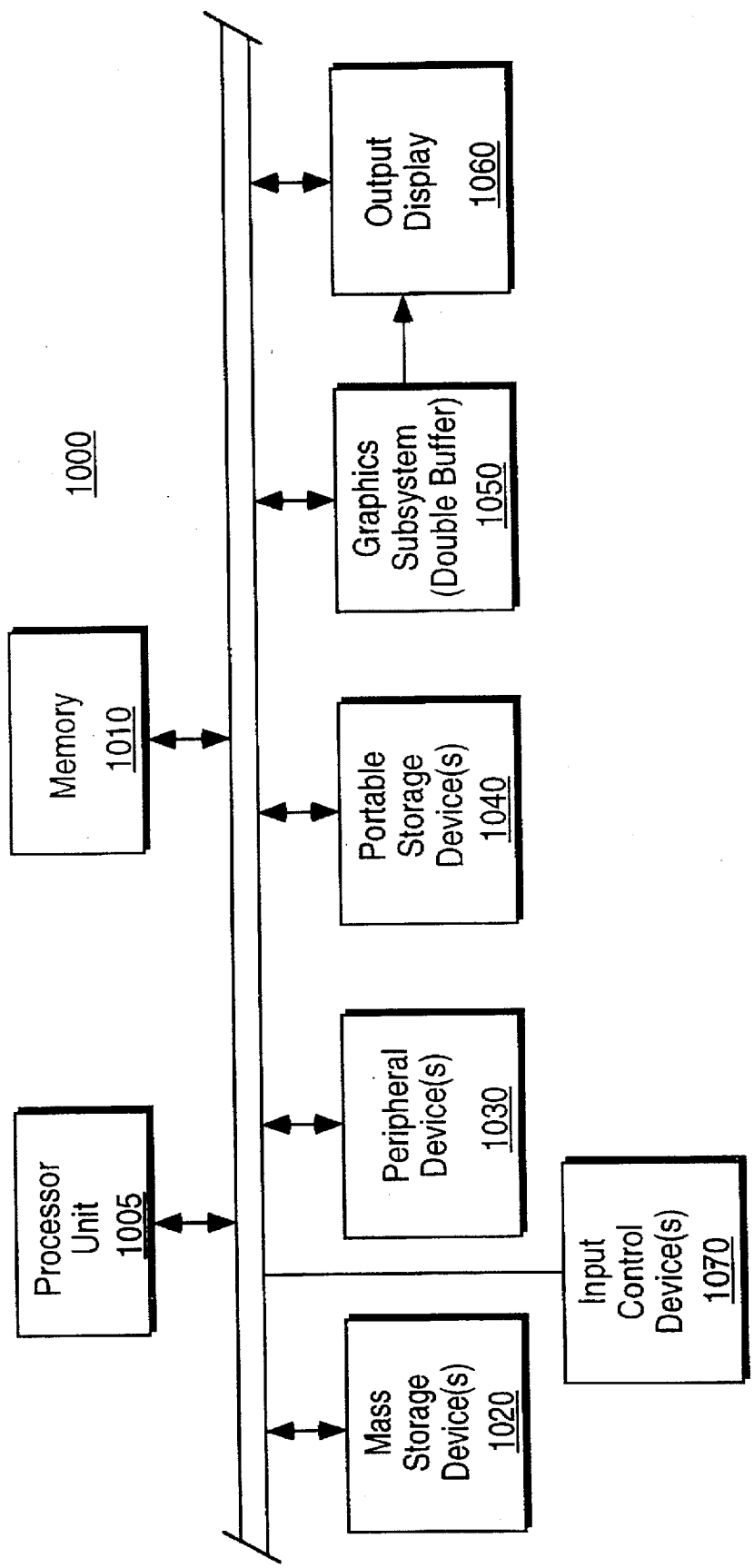
FIG. 6 illustrates a general purpose computer for which the present invention may be implemented.

FIG. 6 illustrates a high level block diagram of a general purpose computer system in which the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the object identification system of the present invention is wholly or partially implemented in software, then the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 6 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the object identification system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the object identification software is stored on such a portable medium, and it is input to the computer system 1000 via the portable storage medium drive 1040. The peripheral device(s) 1030 may include any type of computer support device, such as an input/output (I/O) interface, to add additional functionality to the computer system 1000, For example, the peripheral device(s) 1030 may include a network interface card for interfacing the computer system 1000 to a network. For the software implementation, the documents may be input to the computer system 1000 via a portable storage medium or a network for processing by the object identification system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 200 and the output display 1060. The output display 1060 may include any type of display, such as a cathode ray tube (CRT) display or liquid crystal display (LCD). The graphics subsystem 200 receives textual and graphical information, and it processes the information for output to the output display 1060. The components contained in the computer system 1000 are those typically found in general purpose computer systems, and in fact, these components are intended to represent a broad category of such computer components that are well known in the art.

The object identification system of the present invention may be implemented in either hardware or software. For the software implementation, the object identification system is software that includes a plurality of computer executable instructions for implementation on a general purpose computer system. Prior to loading into a general purpose computer system, the object identification system software may reside as encoded information on a computer readable medium, such as a magnetic floppy disk, magnetic tape, and compact disc read only memory (CD-ROM). In one hardware implementation, the object implementation system may comprise a dedicated processor including processor instructions for performing the functions described herein. Circuits, such as application specific integrated circuits (ASIC), may also be developed to perform the functions described herein.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for identifying an object selected from a plurality of objects displayed on an output display, said method comprising the steps of:

grouping said objects displayed into a plurality of scenes;

generating, for each scene, a series of global unique identifiers to uniquely identify each object in a corresponding scene;

generating a composite universally unique identifier from said series of global unique identifiers from each scene to uniquely identify each object displayed;

identifying, in response to user selection of a scene, a series of global unique identifiers within said universally unique identifier that identifies said scene selected;

generating, in response to user selection of an object in said scene selected, a global unique identifier from said series of global unique identifiers to identify said object selected; and assembling said global unique identifier generated in said composite universally unique identifier.

2. The method as set forth in claim 1, wherein the step of grouping said objects displayed into a plurality of scenes comprises the step of grouping said objects of a hierarchical information structure that includes a plurality of levels such that each level corresponds to at least one scene.

3. The method as set forth in claim 1, wherein the step of grouping said objects displayed into a plurality of scenes comprises the step of grouping said objects for focus and context scenes.

4. The method as set forth in claim 1, wherein the step of generating, in response to user selection of an object in said scene selected, a global unique identifier to identify said object selected comprises the steps of:

partitioning said global unique identifier into a plurality of "n" segments;

mapping each of said "n" segments for said global unique identifier into a storage location such that said storage location maps to a location of an associated object on said output display;

receiving location information, in response to user selection of one of said objects, that identifies an output display location of an object selected;

storing, in a memory at said storage location, during "n" time intervals, one of said "n" segments for each identifier during each time interval;

querying said memory at a location corresponding to said output display location of said object selected during each time interval to extract a segment; and accumulating each segment from each time interval to assemble said global unique identifier.

5. The method as set forth in claim 4, wherein said memory comprises a back buffer in a double buffered graphics subsystem.

6. The method as set forth in claim 5, wherein:

the step of mapping each of said "n" segments for each identifier into a storage location comprises the step of mapping each of said "n" segments into a color representation;

the step of storing one of said "n" segments for each identifier comprises the step of storing a color representation for each segment;

the step of querying said memory at a location of said selected object comprises the step of querying a color at said location to extract a color representation; and the step of accumulating each segment from each time interval comprises the step of accumulating each color representation extracted to assemble said identifier.

7. The method as set forth in claim 1, wherein the step of generating, in response to user selection of an object in said scene selected, a global unique identifier to identify said object selected comprises the steps of:

receiving location information, in response to user selection of one of said objects, that identifies an output display location of an object selected;

storing, in a back buffer of a double buffered graphics subsystem, a color representation for said identifiers; and querying a color in said back buffer at said location of said selected object to extract said identifier.

8. The method as set forth in claim 7, wherein the step of storing a color representation for said identifiers in a back buffer comprises the steps of:

partitioning said global unique identifier into a plurality of "n" segments; and mapping each of said "n" segments into a color representation for said output display.

9. The method as set forth in claim 8, further comprising the step of dynamically determining a per pixel storage capacity for said back buffer to maximize the partitioning of said global unique identifier into said "n" segments.

10. The method as set forth in claim 8; wherein:

the step of storing a color representation for said global unique identifiers comprises the step of storing, during "n" time intervals, a color representation for one of said "n" segments such that each color representation is stored in a separate time interval; and the step of querying a color in said back buffer comprises the steps of querying said color at said location of said selected object during each time interval to extract a bit sequence, and accumulating bit sequences from each time interval to assemble said global unique identifier.

11. The method as set forth in claim 1, wherein the step of identifying a global unique identifier within said universally unique identifier comprises the steps of:

generating a header identifier to uniquely identify each scene in said display;

partitioning said header identifier into a plurality of "n" segments;

mapping each of said "n" segments for said header identifier into a storage location such that said storage location maps to a location of an associated object on said output display;

receiving location information, in response to user selection of one of said scenes, that identifies an output display location of a scene selected;

storing, in a memory at said storage location, during "n" time intervals, one of said "n" segments for each header identifier during each time interval;

querying said memory at a location corresponding to said output display location of said scene selected during each time interval to extract a segment; and accumulating each segment from each time interval to assemble said header identifier.

12. A computer readable medium comprising a plurality of instructions for identifying an object selected from a plurality of objects displayed on an output display, said instructions for:

grouping said objects displayed into a plurality of scenes;

generating, for each scene, a series of global unique identifiers to uniquely identify each object in a corresponding scene;

generating a composite universally unique identifier from said series of global unique identifiers from each scene to uniquely identify each object displayed;

identifying, in response to user selection of a scene, a series of global unique identifiers within said universally unique identifier that identifies said scene selected;

generating, in response to user selection of an object in said scene selected, a global unique identifier from said series of global unique identifiers to identify said object selected; and assembling said global unique identifier generated in said composite universally unique identifier.

13. The computer readable medium as set forth in claim 12, wherein the instructions for generating, in response to user selection of an object in said scene selected, a global unique identifier to identify said object selected comprises the instructions for:

partitioning said global unique identifier into a plurality of "n" segments;

mapping each of said "n" segments for said global unique identifier into a storage location such that said storage location maps to a location of an associated object on said output display;

receiving location information, in response to user selection of one of said objects, that identifies an output display location of an object selected;

storing, in a memory at said storage location, during "n" time intervals, one of said "n" segments for each identifier during each time interval;

querying said memory at a location corresponding to said output display location of said object selected during each time interval to extract a segment; and accumulating each segment from each time interval to assemble said global unique identifier.

14. The computer readable medium as set forth in claim 13, wherein said memory comprises a back buffer in a double buffered graphics subsystem.

15. The computer readable medium as set forth in claim 13, wherein:

the instructions for mapping each of said "n" segments for each identifier into a location comprises instructions for mapping each of said "n" segments into a color representation for said output display;

the instructions for storing one of said "n" segments for each identifier comprises the instructions for storing a color representation for each segment;

the instructions for querying said memory at said location of said selected object comprises instructions for querying a color at said location to extract a color representation; and the instructions for accumulating each segment from each time interval comprises instructions for accumulating each color representation extracted to assemble said identifier.

16. A computer system comprising:

at least one input device for receiving input from a user;

an output display for displaying information to a user;

a graphics subsystem for displaying a plurality of objects, grouped in a plurality of scenes, on said output display;

an identifier assigner for assigning a plurality of global unique identifiers, one for each scene, to uniquely identify each object in a corresponding scene and to assemble a composite universally unique identifier from said global unique identifiers to uniquely identify each object displayed;

a scene identifier for identifying a global unique identifier within said universally unique identifier, in response to user selection of a scene with said input device, that identifies said scene selected;

a global unique identifier generator for generating, in response to user selection of an object with said input device in said scene selected, a global unique identifier to identify said object selected; and a universally unique identifier assembler for assembling said global unique identifier generated in said composite universally unique identifier.

17. The computer system as set forth in claim 16, wherein said global unique identifier generator comprises:

an identifier partitioner, that receives said global unique identifier for said scene selected, for partitioning said global unique identifier into a plurality of "n" segments;

mapper for mapping each of said "n" segments for said global unique identifier into a storage location such that said storage location maps to a location of an associated object on said output display;

memory for storing, at said storage location, during "n" time intervals, one of said "n" segments for each identifier during each time interval;

a user input device for receiving location information, in response to user selection of one of said objects, that identifies an output display location of an object selected;

a querier coupled to said user input device for querying said memory at a location corresponding to said output display location of said object selected during each time interval to extract a segment; and an identifier assembler coupled to said querier for accumulating each segment from each time interval to assemble said identifier.

18. The computer system as set forth in claim 17, wherein:

said memory comprises a back buffer of a double buffered graphics subsystem;

said mapper comprises a color mapper for mapping each of said "n" segments into a color representation and an object painter for storing a color representation for each segment;

said querier comprises a pixel querier for querying a color at said location to extract a color representation; and said identifier assembler for assembling said color representation extracted to assemble said identifier.

* * * * *